US011638956B2

(12) United States Patent
Price (10) Patent No.: US 11,638,956 B2
(45) Date of Patent: May 2, 2023

(54) HOT ISOSTATIC PRESSING CONSOLIDATION OF POWDER DERIVED PARTS

(71) Applicant: BAE Systems plc, London (GB)

(72) Inventor: Howard James Price, Blackburn (GB)

(73) Assignee: BAE Systems plc, London (GB)

( * ) Notice: Subject to any disclaimer, the term of this patent is extended or adjusted under 35 U.S.C. 154(b) by 158 days.

(21) Appl. No.: 17/261,431

(22) PCT Filed: Aug. 7, 2019

(86) PCT No.: PCT/GB2019/052211
§ 371 (c)(1),
(2) Date: Jan. 19, 2021

(87) PCT Pub. No.: WO2020/030906
PCT Pub. Date: Feb. 13, 2020

(65) Prior Publication Data
US 2021/0213526 A1 Jul. 15, 2021

(30) Foreign Application Priority Data

Aug. 7, 2018 (EP) .................................... 18275113
Aug. 7, 2018 (GB) .................................. 1812815.7

(51) Int. Cl.
*B22F 3/15* (2006.01)
*B22F 10/20* (2021.01)
*B22F 3/16* (2006.01)
*B22F 3/24* (2006.01)
*B33Y 40/20* (2020.01)

(52) U.S. Cl.
CPC .................. *B22F 3/15* (2013.01); *B22F 3/16* (2013.01); *B22F 3/24* (2013.01); *B22F 10/20* (2021.01); *B22F 2003/248* (2013.01); *B22F 2998/10* (2013.01); *B22F 2999/00* (2013.01); *B33Y 40/20* (2020.01)

(58) Field of Classification Search
CPC .................................. B22F 3/15; B22F 10/20
USPC .......................................................... 419/49
See application file for complete search history.

(56) References Cited

U.S. PATENT DOCUMENTS 5,397,050 A   3/1995  Mueller
5,411,571 A   5/1995  Kobayashi et al.
(Continued)

FOREIGN PATENT DOCUMENTS

EP    0580081 A1   1/1994
EP    2340905 A1   7/2011
(Continued)

OTHER PUBLICATIONS

International Search Report and Written Opinion of International Application No. PCT/GB2019/052211, dated Oct. 2, 2019, 13 pages.
(Continued)

*Primary Examiner* — Weiping Zhu
(74) *Attorney, Agent, or Firm* — Maine Cernota & Rardin (57) ABSTRACT

A method of forming a metal component from metal powder which includes exposing the metal powder to an inert gas; consolidating the metal powder into a solid metal; followed by exposing the solid metal to a hot isostatic pressing process to form a metal component, wherein the hot isostatic pressing process has one initial compression cycle followed by at least one decompression and recompression cycle.

16 Claims, 4 Drawing Sheets

(56) References Cited

U.S. PATENT DOCUMENTS

| | | | |
|---|---|---|---|
| 5,864,744 A | 1/1999 | Bigay | |
| 6,506,227 B1 | 1/2003 | Tornberg | |
| 2003/0215539 A1 | 11/2003 | Manabe et al. | |
| 2011/0142709 A1 | 6/2011 | Voice et al. | |
| 2013/0071562 A1* | 3/2013 | Szuromi | B22F 3/24 |
| | | | 427/237 |

FOREIGN PATENT DOCUMENTS

| | | |
|---|---|---|
| JP | H04160104 A | 6/1992 |
| JP | H107467 A | 1/1998 |
| WO | 0015371 A1 | 11/2000 |
| WO | 2005049251 A1 | 6/2005 |

OTHER PUBLICATIONS

Search Report under Section 17(5) of Great Britain Application No. GB1812815.7, dated Feb. 8, 2019, 4 pages.
Extended European Search Report of European Application No. EP18275113.1, dated Feb. 6, 2019, 7 pages.
Combined Search and Examination Report under Sections 17 and 18(3) of Great Britain Application No. GB1911290.3, dated Jan. 28, 2020, 5 pages.
International Preliminary Report on Patentability for PCT Appl. No. PCT/GB2019/052211, dated Feb. 18, 2021, 8 Pages.

\* cited by examiner

HOT ISOSTATIC PRESSING CONSOLIDATION OF POWDER DERIVED PARTS

RELATED APPLICATIONS

This application is a national phase application filed under 35 USC § 371 of PCT Application No. PCT/GB2019/052211 with an International filing date of Aug. 7, 2019, which claims priority of GB Patent Application 1812815.7, filed Aug. 7, 2018, and EP Patent Application 18275113.1, filed Aug. 7, 2018. Each of these applications is herein incorporated by reference, in its entirety, for all purposes.

FIELD OF THE INVENTION

The present invention generally relates to Hot Isostatic Pressing (HIP) of metal powder. The invention has particular application in the aerospace industry and in the production of metal aircraft components.

BACKGROUND

Hot Isostatic Pressing (HIP) is a process that can be used to densify powders, cast parts or sintered parts at high pressure and high temperatures. It is widely used in the manufacture of complex, metal parts in the aerospace industry and has become an alternative to conventional processes such as forging, casting and machining.

Typically, a HIP process will involve one high pressure/high temperature cycle, where the temperature and pressure are applied, held for a period of time, known as the soak period (determined by the properties of the material, design of the HIP system, desired characteristics of the formed material etc.) and then the pressure released to atmospheric pressure and the temperature returned to ambient/room temperature.

HIP is generally utilised in two principle ways; as a primary production process or as a secondary production process.

When used as a primary production process, HIP is used to produce the finished solid metal parts/components from metal powders. Metal powder is placed into a container, known as a can, and is usually flushed with an inert gas, such as argon. The can (and canned powder) is then evacuated and sealed from the external atmosphere. Pressure and heat are then applied such that the powder is compressed (compacted) and then fused into solid metal.

At the end of such a process, a high residual gas pressure will remain within any residual microscopic gas pores in the metal, which can increase further if the component is subjected to high temperatures in subsequent manufacturing processes or in operation. An increase in the internal gas pressure within sealed pores can cause the pores to re-open and damage the integrity of the surrounding structure.

When used as a secondary production process, HIP is used in combination with a primary production process such as casting or a powder metallurgy (PM) process (e.g. additive layer manufacturing (ALM) technologies) so as to consolidate and diffusion bond internal (i.e. non surface breaking) defects in the primary produced part. For example, in the case of casting metal components, defects are often encountered in the form of shrinkage porosity. These shrinkage defects can often adversely affect the casting's properties or functionality. HIP processing of cast parts has been shown to successfully reduce such shrinkage porosity, thus improving the integrity of the casting.

Another well-known manufacturing technique which uses powdered metal and which also can suffer from deleterious porosity in the final product is selective laser melting (SLM). In this technique a high power-density laser is used to melt and fuse metal powders together. An inert gas, usually argon gas in the case of titanium powder SLM, is used both as a purge gas to displace air from the powder, and as a gas stream to act as the medium for the carry-over of spatter caused by the laser interacting with the powder. It is also used to maintain an inert atmosphere inside the SLM chamber. The use of SLM in the manufacturing of metal components in the aerospace industry may be limited by the potential for porosity within the components produced by SLM.

There is therefore a need to provide a method of manufacturing reduced-porosity, high performance components. This need is particularly high in the aerospace industry.

SUMMARY OF THE INVENTION

In a first aspect, the present invention provides a method of forming a metal component from metal powder, the method comprising: (a) exposing the metal powder to an inert gas; (b) consolidating the metal powder into a solid metal; followed by (c) exposing the solid metal to a hot isostatic pressing process to form a metal component, wherein the hot isostatic pressing process comprises one initial compression cycle followed by at least one decompression and recompression cycle.

Preferably there are two decompression and recompression cycles.

The one initial compression cycle may comprise increasing the temperature to a first temperature. Preferably the first temperature is maintained throughout step (c). In other words, the first temperature is preferably maintained throughout the one initial compression cycle and the at least one (preferably two) decompression and recompression cycle(s).

The method may further comprise, following step (c), (d) a final decompression to an intermediate pressure between the compression pressure of the recompression cycle(s) (of step (c)) and atmospheric pressure or below. In other words, preferably step (d) comprises decompressing to an intermediate pressure between the compression pressure of the at least one recompression cycle and atmospheric pressure or below. If there are more than one decompression and recompression cycles, the intermediate pressure may be considered between the compression pressure of the last recompression cycle and atmospheric pressure or below. Alternatively the intermediate pressure may be considered between the compression pressure of the first recompression cycle and atmospheric pressure or below Preferably the one initial compression cycle comprises increasing the temperature to a first temperature and the method involves maintaining the first temperature throughout steps (c) and (d).

Preferably the method further comprises (d) holding the intermediate pressure for a period of time whilst maintaining the first temperature. Preferably the method of the present invention further comprises a final step of (e) reducing the intermediate pressure to atmospheric pressure or below, at the same time as reducing the first temperature to room/ambient temperature. In other words, it is preferable that the method further involves (d) an intermediate pressure hold at an intermediate pressure which is between the compression pressure of the recompression cycle and atmospheric pressure or below, and (e) a final reduction of the pressure to atmospheric pressure or below, along with a reduction of the first temperature to room temperature.

Preferably, after the final reduction of pressure and temperature (in step (e)), the method of the present invention is finished to produce a metal component with reduced porosity (when compared to the solid metal used in step (b)).

Steps (a) and (b) may be part of a primary hot isostatic pressing method or an additive layer manufacturing method. The additive layer manufacturing method may be selective laser melting.

The metal powder may be selected from the group consisting of nickel, cobalt, titanium, iron, aluminium and alloys thereof. The metal powder may be a titanium alloy, for example an alpha, beta or alpha-beta titanium alloy. Suitable titanium alloys include Ti-5Al-2.5Sn (alpha), Ti-8Al-1Mo-1V (alpha), Ti-6Al-4Sn-4Zr-0.7Nb-0.5Mo-0.4Si (alpha), Ti-6Al-2Sn-4Zr-2Mo (alpha-beta), Ti-6Al-4V (alpha-beta), Ti-6Al-6V-2Sn (alpha-beta), Ti-6Al-2Sn-4Zr-6Mo (alpha-beta), Ti-10V-2Fe-3Al (beta) and Ti-3Al-8V-6Cr-4Mo-4Zr (beta). Preferably the metal is a titanium/aluminium/vanadium alloy. Preferably the metal is an alpha-beta-phase Ti-6% Al-4% V alloy.

The inert gas is preferably soluble in the solid metal. Preferably the inert gas is helium. Most preferably, the inert gas is helium and the metal powder is an alpha, beta or alpha-beta titanium alloy. Preferably the gas is a gas having 40-60% of the radius of the metal atom, for example titanium atoms. More preferably the gas is a gas that has a radius 50-60% of that of the metal, most preferably 55%. Helium has an effective atomic radius that is 55% that of titanium and thus advantageously will enable a relatively high rate of diffusion of helium through titanium alloys.

The one initial compression cycle may comprise increasing the pressure to a first pressure between 100 to 300 MPa (preferably 200 to 300 MPa) and increasing the temperature to a first temperature between 500 to 1500° C. (preferably 800 to 1000° C.). The first pressure and first temperature may be held for a period of time ranging from 30 to 120 minutes (preferably 60 to 100 minutes).

The at least one decompression and recompression of step (c) may comprise reducing the first pressure to atmospheric pressure or below followed by increasing the pressure back to a second pressure, which second pressure is substantially the same (or the same) as the first pressure, and wherein the first temperature is maintained throughout the at least one decompression and recompression step. The atmospheric pressure or below may be held for a period of time ranging from 5 to 120 minutes. For example, the decompressed state hold time (i.e. the time that should be allowed for diffusion in the reduced pressure state) is typically about 5-30 minutes especially for titanium alloys, preferably about 5-20 minutes, 10-20 minutes, 12-18 minutes, more preferably about 15 minutes.

The second pressure may be held for a period of time ranging from 30 to 120 minutes or 30 to 100 minutes, for example 30 to 40 minutes or 60 to 100 minutes, for example 60 minutes.

After the at least one decompression and recompression cycle of step (c): the method may further comprise the step of (d) lowering the pressure to a third pressure which is between the first pressure and atmospheric pressure or below, and holding the third pressure for a period of time ranging from 30 to 120 minutes (preferably 50 to 70 minutes, for example 60 minutes), before (e) lowering the third pressure to atmospheric pressure or below.

Primary hot isostatic pressing process may mean that the solid metal is formed from metal powder in a can in the usual known way. Step (c) (or (c) and (d)) may then be considered a secondary hot isostatic pressing process. For example, the solid part could be removed from the can and placed back in the HIP chamber and subjected to a second modified hot isostatic pressing process. Alternatively, the solid part may stay in the can, with the temperature maintained (i.e. not reduced to ambient/room temperature) and applying a second HIP process. Either way, the HIP of steps (a) and (b) may be considered a distinct process from the HIP of step (c) or (c) and (d).

The method may be finalised, after step (c) or (d), by (e) reducing the second, third or intermediate pressure to atmospheric pressure or below. The first temperature may at the same time, be reduced down to ambient/room temperature and the method of the present invention finished to produce a metal component with reduced porosity (when compared to the solid metal used in step (b)).

Preferably step (c) or step (c) with step (d) of the method of the present invention reduces the porosity of the solid metal formed after step (b) to below 10%, below 5%, below 3%, below 2%, below 1%, preferably 0% porosity. Percentage porosity may be considered (total volume of voids/total volume)×100. In other words the porosity of the metal component is preferably below 10%, below 5%, below 3%, below 2%, below 1%, more preferably 0% porosity.

The metal component may be an aircraft component. For example, it may be an aircraft skin or stringer.

In a further aspect of the present invention there is provided an aircraft component produced by the method as defined herein.

BRIEF DESCRIPTION OF THE DRAWINGS

Further details, aspects and embodiments will be described, by way of example only, with reference to the drawings. Elements in the figures are illustrated for simplicity and clarity and have not necessarily been drawn to scale.

DETAILED DESCRIPTION

Figure 1A:
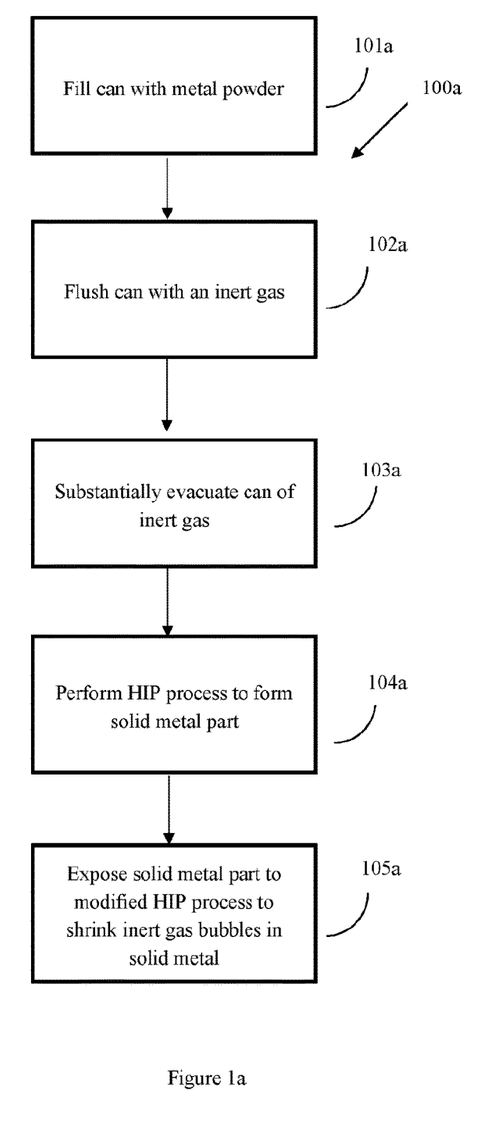
FIG. 1a shows a flow chart which details the stages in a manufacturing process that may be present in the lead up to the modified HIP process.

FIG. 1a shows a flow chart of a manufacturing process 100a including primary HIP formation and subsequent secondary HIP processing using, for example, a Quintus QIH286 HIP Press. At step 101a a HIP can is filled with metal powder, for example a titanium powder. At step 102a the metal powder inside the HIP can is flushed (purged) with an inert gas. In the process of the current disclosure, helium may be utilised with a titanium powder (such as a Ti-6Al-4V powder), however any gas soluble in the metal being used and which is non-deleterious, may be utilised.

At step 103a the can is substantially evacuated of the inert gas and is then sealed. Inevitably a very small amount of the inert gas will remain in the powder grains.

At step 104a the can is pressed in a HIP cycle to form the component. At the end of step 104a, the metallic powder will have fused and diffusion bonded to become a solid component, but defects, for example bubbles formed from residual helium that was not evacuated from the HIP can, may remain in the form of residual gas porosity.

At the end of step 104a the temperature is not reduced pending moving to the following step 105a.

To reduce the porosity of the component, the HIP cycle may be continued in a contiguous manner (i.e. whilst maintaining an elevated temperature and the component remains in the can) by applying a further HIP process in step 105a. This is a modified/enhanced HIP process that has been developed to shrink the size of gas bubbles in the component, therefore reducing the porosity of the component.

Figure 1B:
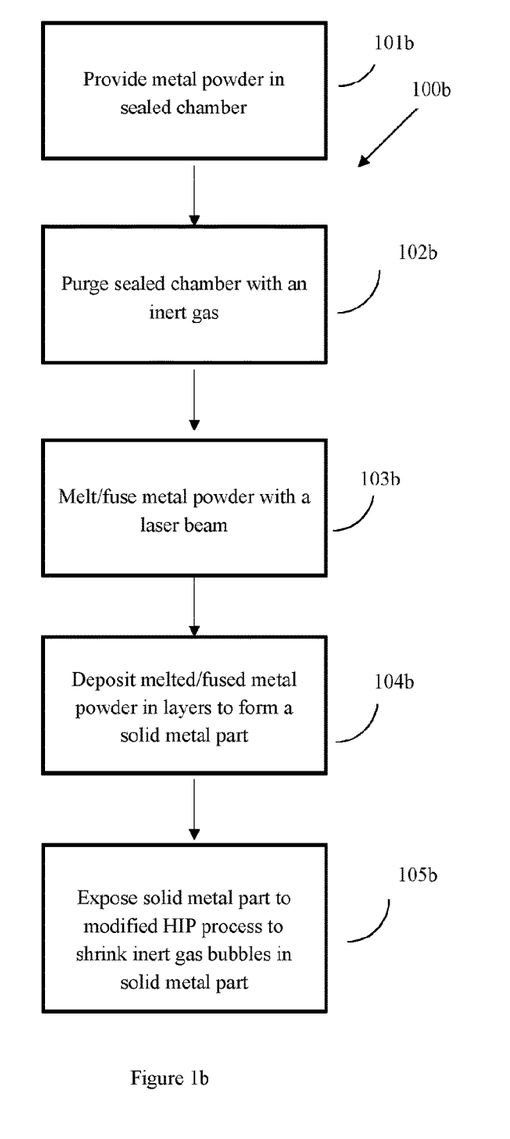
FIG. 1b shows a flow chart which details the stages in another manufacturing process that may be present in the lead up to the modified HIP process.

FIG. 1b shows a flow chart of a manufacturing process 100b including primary SLM processing (using for example a Renishaw REN AM 500Q) and subsequent secondary HIP processing.

At step 101b a metal powder, for example, a titanium alloy is provided in a SLM chamber. At step 102b the metal powder (and SLM chamber) is purged with an inert gas. In the process of the current disclosure, helium may be utilised with a titanium powder (such as a Ti-6Al-4V powder), however any gas soluble in the metal being used and which is non-deleterious, may be utilised.

The soluble inert gas is used as the purge gas to purge the powder of any air, and as the gas stream to act as the medium for the carry-over of spatter caused due to the laser interacting with the powder in step 104b. It is also used to maintain an inert atmosphere inside the SLM chamber in which the steps of 101b-104b are carried out.

At step 103b the metal powder is melted or fused together by the action of a high power-density laser. Inevitably a very small amount of the inert gas will remain in the powder grains.

At step 104b the melted material is deposited in layers (e.g. on a base plate of a work piece). Subsequent layers are then built up upon each preceding layer. At the end of step 104b, the metal powder will have fused and diffusion bonded to become a solid component, but defects, for example bubbles formed from the helium, may remain in the form of residual gas porosity. The solid component is then removed from the SLM chamber.

At step 105b the solid component is treated using a modified HIP process to significantly reduce the size of the trapped gas pores, thereby reducing the porosity of the component.

Any surface breaking defects in SLM will most likely not be healed by the HIP process. If this is the case and on inspection these surface defects are present, the surface layer (and defects) may be removed by, for example, electrochemical machining.

Figure 2:
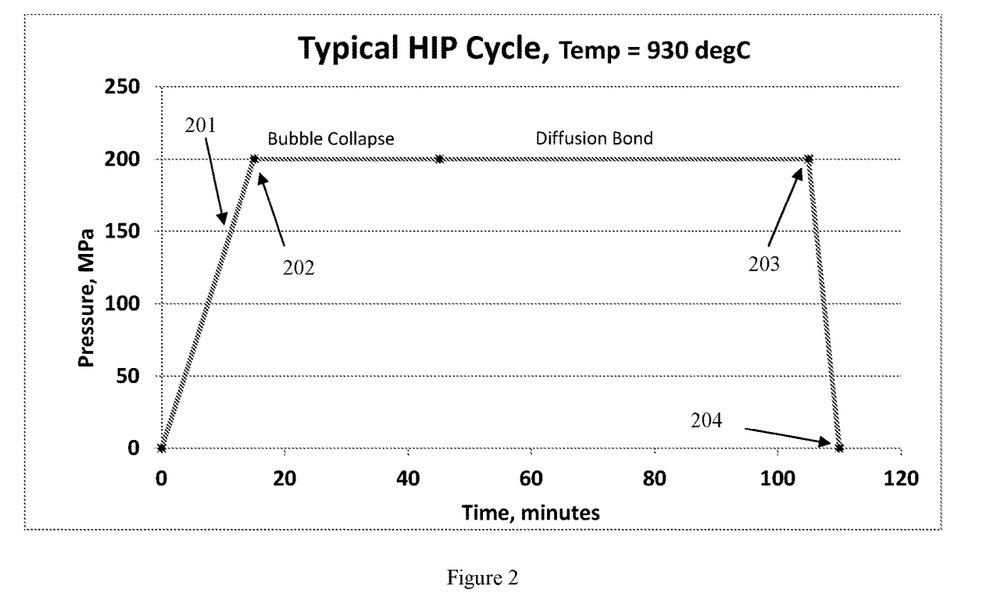
FIG. 2 shows an example of a typical HIP cycle.

FIG. 2 shows a typical HIP cycle for a titanium component, such as that performed at step 104a. The HIP cycle begins with step 201—an increase in pressure to approximately 200 MPa (and generally at least about 100 MPa) and increase in temperature to approximately 930° C. over a period of time, such as about 10-20 minutes (for example 15 minutes). When a sufficiently high pressure and temperature are reached, in this illustrative case 200 MPa and 930° C., the helium gas bubbles (e.g. residual gas entrapment from the can flushing process) start to collapse (point 202) and shrink. The internal pressure of the helium gas bubble, in turn, increases. The pressure and temperature are then held for a soak period. The soak period is a sufficient period of time for the bubble to continue to collapse as much as possible at this specific pressure and temperature, and for diffusion bonding to occur in the metal around the bubble. In this case, the soak period is approximately 90-100 minutes (for example 90 minutes). At the end of the soak period (point 203), the pressure is released and brought back to around atmospheric pressure. The temperature is also reduced down to room/ambient temperature.

Figure 3:
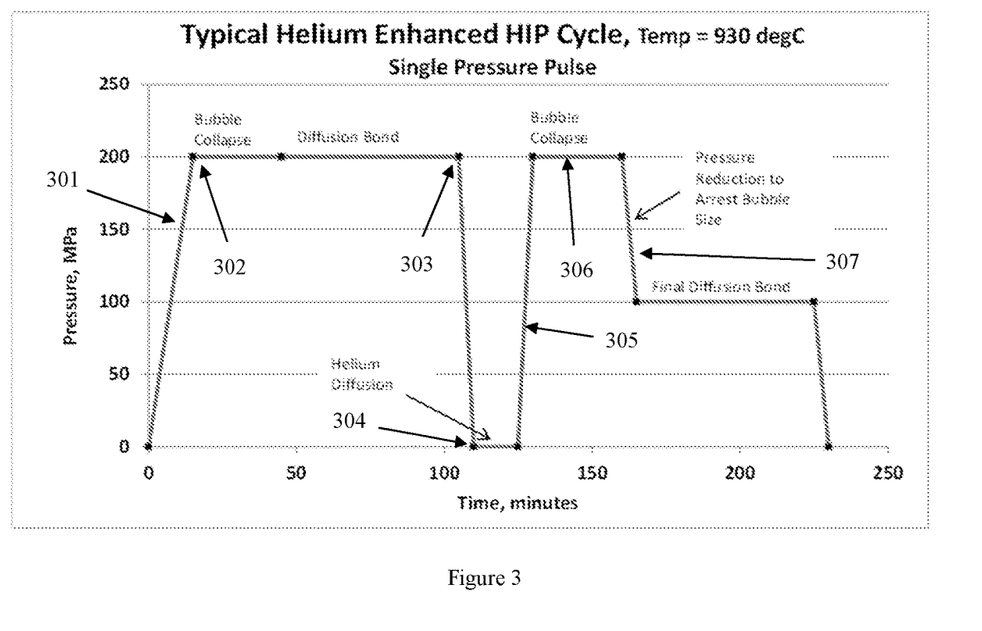
FIG. 3 shows an example enhanced HIP cycle made up of a typical HIP cycle followed by a subsequent re-application of HIP pressure (a single pressure pulse).

Referring now to FIG. 3, which shows an example modified/enhanced HIP cycle, for example as is noted in 105a or 105b of FIG. 1a or 1b, for shrinking residual helium gas bubbles (residual helium gas entrapment/porosity) in a previously manufactured titanium component (for example previously produced by HIP or SLM). In the case of FIG. 1a, it will be appreciated that the process exemplified in FIG. 3 may be carried out after 104a or the process exemplified in FIG. 3 may encompass 104a and 105a.

The HIP cycle begins with step 301—an increase in pressure to a first pressure and an increase in temperature to a first temperature over a first period of time. For example, about 200 MPa (and generally at least about 100 MPa), about 930° C. and for about 10-20 minutes (for example 15 minutes). When a sufficiently high pressure and temperature are reached, in this case 200 MPa and 930° C., the helium gas bubbles start to collapse and shrink (point 302). The internal pressure of the helium gas bubble in turn increases. The pressure and temperature are then held for a first soak period. The first soak period is a sufficient period of time for the helium bubble to continue to collapse as much as possible at this pressure and temperature, and for newly interacting intimate surfaces to diffusion bond to each other. The first soak period in FIG. 3 is approximately 90-100 minutes, for example 90 minutes.

At the end of the first soak period (point 303), the first pressure is released and brought back to approximately atmospheric pressure or below, whilst maintaining the first temperature at the elevated level (point 304), e.g. 930° C. This decompressed state is held for a period of time sufficient to allow some of the previously pressurised helium gas to diffuse into the metallic matrix (decompressed state hold time). The isostatic pressure in the titanium is thus relieved by the decompression of the HIP chamber which thereby allows the pockets of pressurised helium gas to begin diffusion into the titanium (the diffusion being driven by the pressure gradient between the high helium gas pressure and the titanium). The helium pressure in each gas bubble will in turn reduce as the diffusion process proceeds and so the rate of diffusion will progressively reduce as more diffusion occurs. The decompressed state hold time should be sufficiently enough time for the diffusion process to substantially conclude. For example, the decompressed state hold time (i.e. the time that should be allowed for diffusion in the reduced pressure state) is typically about 5-30 minutes for titanium alloys, preferably about 15 minutes. The pressure is then once again increased (step 305) to a second pressure, which is substantially the same (±5% differential) as the original first elevated pressure, in this case 200 MPa, and held again for a second soak period (step 306). This causes further collapse of the previously reduced size helium bubble and further diffusion bonding. The second soak period is either the same time as the first soak period (e.g. 90-100 minutes) or shorter than the first soak period (e.g. approximately 30-40 minutes, for example 30 minutes). It will be appreciated that the choice of second soak period time will depend on a balance between maximising the diffusion bonding and bubble collapse, and also economic considerations. Preferably the second soak period is 30-100 minutes and does not exceed 100 minutes.

In the example of FIG. 3, the second pressure is then reduced (step 307), after the bubble has almost collapsed, to a third pressure which is an intermediate pressure between the first pressure (and the second pressure, which is substantially the same as the first pressure) and atmospheric pressure or below. This intermediate pressure is a pressure that is able to facilitate diffusion bonding but does not facilitate further reduction in the size of any bubbles. The third intermediate pressure is held for approximately 30-120 minutes, for example 60 minutes. In FIG. 3, the intermediate pressure is approximately 100 MPa.

Although diffusion bonding occurs at the original first elevated pressure and second pressure (bubble collapse pressure), a lower, intermediate pressure ensures that the bubble does not continue to reduce in size during the diffusion bonding phase, but is held at a steady size and ensures that the diffusion bonding occurs in a steady state condition (the diffusion bonding can take place without further shrinkage). In other words, the step 307 pressure reduction (to an intermediate pressure) acts to arrest the bubble size and thus ensures steady state diffusion bonding. This ensures that the reduced-sized, arrested/stable bubble is surrounded by fully diffusion bonded material. Without this pressure reduction step 307, the material directly adjacent to the bubble may only be partially bonded (owing to the reduced time in intimate contact), thus potentially making it vulnerable to either partial peeling or cracking on release of the HIP pressure. Further, cracks may also develop in service. The use of an intermediate pressure hold before the final reduction to atmospheric pressure or below (e.g. approx. 0 MPa) thus advantageously avoids such problems.

Advantageously, the helium diffusion into the metallic matrix which occurs at step 304 when the HIP pressure is first removed allows the bubble to be further compressed in size when the HIP pressure is re-applied at step 305. Without the time period at step 304 with the HIP pressure removed there would be little or no opportunity for the helium to diffuse into the surrounding titanium metal.

There are several variations that are possible when carrying out the process of the present invention, for example as described with reference to FIG. 4.

The same HIP equipment, metal powder and container are used as in FIG. 3. Whereas FIG. 3 illustrates one decompression and recompression cycle before the final (intermediate pressure) diffusion bond stage, FIG. 4 illustrates two decompression and recompression cycles before the final (intermediate pressure) diffusion bond stage.

This allows the bubble to be reduced in size and for some of the helium to diffuse into the metal matrix multiple times before the final diffusion bond is formed and the process is terminated. The final diffusion bonding step of the process may require a slightly longer period of time to ensure full diffusion bonding of the final collapsed gas bubble. The process may be repeated as many times as necessary. The use of the decompression and recompression cycle(s) and an intermediate pressure on helium produced titanium parts is particularly advantageous.

Figure 4:
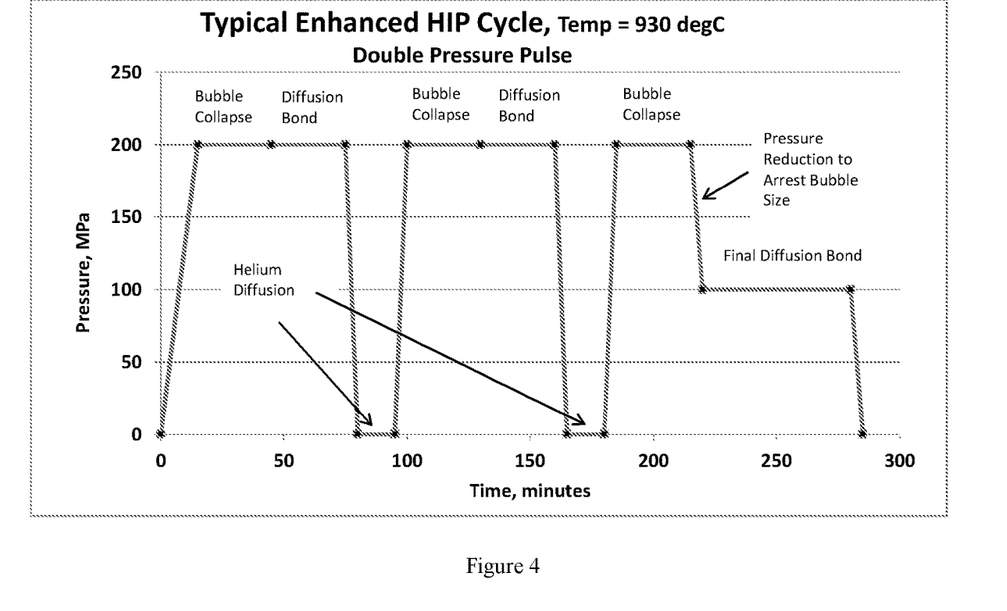
FIG. 4 shows a further example enhanced HIP cycle made up of a typical HIP cycle followed by two subsequent re-applications of HIP pressure (a double pressure pulse).

Referring to FIG. 4, the HIP cycle begins with an increase in pressure to a first pressure and an increase in temperature to a first temperature over a first period of time. For example, about 200 MPa (and generally at least about 100 MPa), about 930° C. and for about 10-20 minutes (for example 15 minutes). The pressure and temperature are then held for a first soak period. The first soak period in FIG. 4 is approximately 60-100 minutes, for example around 60-65 minutes.

At the end of the first soak period, the first pressure is released and brought back to approximately atmospheric pressure or below, whilst maintaining the first temperature at the elevated level, e.g. 930° C. This first decompressed state is held for sufficiently enough time for the diffusion process to substantially conclude. For example, the first decompressed state hold time (i.e. the time that should be allowed for diffusion in the reduced pressure state) is typically about 5-30 minutes for titanium alloys, preferably about 15 minutes.

The pressure is then once again increased to a second pressure, which is substantially the same (±5% differential) as the original first elevated pressure, in this case 200 MPa, and held again for a second soak period. The second soak period is either the same time as the first soak period (e.g. 60-65 minutes) or shorter than the first soak period (e.g. approximately 30-40 minutes, for example 30 minutes). It will be appreciated that the choice of second soak period time will depend on a balance between maximising the diffusion bonding and bubble collapse, and also economic considerations. Preferably the second soak period is 30-100 minutes and does not exceed 100 minutes.

At the end of the second soak period, the second pressure is released and brought back to approximately atmospheric pressure or below, whilst maintaining the first temperature at the elevated level, e.g. 930° C. This second decompressed state is held for sufficiently enough time for the diffusion process to substantially conclude. For example, the second decompressed state hold time (i.e. the time that should be allowed for diffusion in the reduced pressure state) is typically about 5-30 minutes for titanium alloys, preferably about 15 minutes.

The pressure is then once again increased to a third pressure, which is substantially the same (±5% differential) as the original first and/or second elevated pressure, in this case 200 MPa, and held again for a third soak period. The third soak period is either the same time as the first soak period and/or second soak period (e.g. 60-65 minutes) or shorter than the first and/or second soak period (e.g. approximately 15-30 minutes, for example 20 minutes). It will be appreciated that the choice of third soak period time will depend on a balance between maximising the diffusion bonding and bubble collapse, and also economic considerations. Preferably the third soak period is 15-100 minutes and does not exceed 100 minutes. For example the third soak period may be 15-60 minutes or 15-20 minutes.

In the example of FIG. 4, the third pressure is then reduced, after the bubble has almost collapsed, to a fourth pressure which is an intermediate pressure between the first pressure (and the second and/or third pressure, which both may be substantially the same as the first pressure) and atmospheric pressure or below. This intermediate pressure is a pressure that is able to facilitate diffusion bonding but does not facilitate further reduction in the size of any bubbles. The fourth intermediate pressure is held for approximately 30-120 minutes, for example 60 to 70 minutes. In FIG. 4, the intermediate pressure is approximately 100 MPa. The intermediate pressure is then finally reduced to atmospheric pressure or below (e.g. approx. 0 MPa), along with the first temperature reduced to room temperature.

In the examples presented, helium is used since it is a sufficiently small gas atom that diffusion can occur into the titanium used in these examples. It will be apparent that other inert gases may also be used when the process is performed with other metals, provided there is—

(a) an adequate pressure differential to drive the process, whereby the inert gas is at a higher pressure (caused by volumetric reduction due to the HIP process) than the metal;

(b) enough time at high pressure and temperature to allow newly interacting intimate surfaces to diffusion bond to each other, thus allowing the gas pockets to be rigidly constrained;

(c) the gas is soluble in the metal at the pressure levels achieved; and (d) significant pressure reduction in the metal is achieved by diffusion of inert gas into metal (driven by pressure gradient, when external HIP pressure removed).

In the examples of the present invention, for a Ti-6Al-4V component with residual helium porosity, the first pressure is about 200 MPa, and the first temperature is about 930° C. Further, the second and/or third pressure is about 200 MPa, and the intermediate pressure is about 100 MPa.

The first, second, third and intermediate HIP pressures used are however dependent on the metal. They are all typically in the region of 100 MPa to 300 MPa. If pressures below 100 MPa are used then process times would need to be increased accordingly.

The first temperature is again dependent on the metal used. In the case of titanium alloys, it should be above 800° C. but should normally be less than the beta transus temperature (which is approximately 960° C. for Ti-6Al-4V) if an alpha-beta microstructure is required. Higher temperatures can be used provided the microstructural effects are acceptable and the component does not distort.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A method of forming a metal component from metal powder, the method comprising:
   (a) exposing the metal powder to an inert gas;
   (b) consolidating the metal powder into a solid metal;
   (c) exposing the solid metal to a hot isostatic pressing process to form a metal component, wherein the hot isostatic pressing process comprises one initial compression cycle followed by at least one decompression and recompression cycle; and
   (d) decompressing to second pressure that is sufficient for diffusion to occur, but insufficient for bubble collapse.

2. The method according to claim 1, wherein the one initial compression cycle comprises increasing a temperature of the hot isotactic pressing process to a first temperature and wherein the method further comprises maintaining the first temperature throughout steps (c) and (d).

3. The method according to claim 2, wherein step (d) comprises holding the second pressure whilst maintaining the first temperature, and wherein the method further comprises (e) reducing the second pressure to atmospheric pressure or below, at the same time as reducing the first temperature to room temperature.

4. The method according to claim 1, wherein steps (a) and (b) are part of a primary hot isostatic pressing method or an additive layer manufacturing method.

5. The method according to claim 4, wherein the additive layer manufacturing method is selective laser melting.

6. The method according to claim 1, wherein the metal powder is selected from the group consisting of nickel, cobalt, titanium, iron, aluminium, and alloys thereof.

7. The method according to claim 1, wherein the inert gas is soluble in the solid metal.

8. The method according to claim 1, wherein the inert gas is helium and the metal powder is an alpha, beta, or alpha-beta titanium alloy.

9. The method according to claim 1, wherein the one initial compression cycle comprises increasing a pressure to a first pressure between 100 to 300 MPa and increasing a temperature to a first temperature between 500 to 1500° C.

10. The method according to claim 9, wherein the first pressure and first temperature are held for a period of time ranging from 30 to 120 minutes.

11. The method according to claim 9, wherein the at least one decompression and recompression of step (c) comprises reducing the first pressure to atmospheric pressure or below followed by increasing the pressure back to a third pressure, which third pressure is substantially the same as the first pressure, and wherein the first temperature is maintained throughout the at least one decompression and recompression step.

12. The method according to claim 11, wherein the atmospheric pressure or below is held for a period of time ranging from 5 to 120 minutes.

13. The method according to claim 11, wherein the third pressure is held for a period of time ranging from 30 to 120 minutes.

14. The method according to claim 11, wherein step (d) comprises lowering the third pressure to the second pressure and holding the second pressure for a period of time ranging from 30 to 120 minutes, before lowering the second pressure to atmospheric pressure or below.

15. An aircraft component produced by the method according to claim 1.

16. A method of forming a metal component from metal powder, the method comprising:
   (a) exposing the metal powder to an inert gas;
   (b) consolidating the metal powder into a solid metal;
   (c) exposing the solid metal to a hot isostatic pressing process to form a metal component, wherein the hot isostatic pressing process comprises one initial compression cycle followed by at least one decompression and recompression cycle; and
   (d) decompressing to a second pressure that is sufficient for diffusion to occur, but insufficient for bubble collapse,
   wherein step (d) is carried out after bubbles present in the solid metal have almost collapsed.

* * * * *